United States Patent [19]

Zeigler, Jr. et al.

[11] 4,186,043
[45] Jan. 29, 1980

[54] METHOD FOR HEMMING FABRIC USING A HOT MELT ADHESIVE

[75] Inventors: George E. Zeigler, Jr., Eden, N.C.; Henry S. Hutcherson, New Providence, N.J.

[73] Assignee: Fieldcrest Mills, Inc., Eden, N.C.

[21] Appl. No.: 878,555

[22] Filed: Feb. 17, 1978

[51] Int. Cl.² ............................................. B32B 31/20
[52] U.S. Cl. .................................... 156/204; 156/227; 156/322; 156/295; 156/465; 156/498; 156/499; 156/500; 156/202
[58] Field of Search ............... 156/200, 202, 204, 226, 156/227, 322, 498, 499, 555

[56] References Cited

U.S. PATENT DOCUMENTS

| | | | |
|---|---|---|---|
| T926,010 | 8/1974 | Elliott et al. | 156/204 |
| 1,041,130 | 10/1912 | Maxwell et al. | |
| 3,038,982 | 6/1962 | Ludlow | 156/499 |
| 3,143,456 | 8/1964 | McGrath et al. | |
| 3,242,025 | 3/1966 | Copp | |
| 3,654,051 | 4/1972 | Purcell et al. | |
| 3,671,355 | 6/1972 | Paymal | 156/555 |
| 3,988,192 | 9/1976 | Landis et al. | 156/322 |

Primary Examiner—John T. Goolkasian
Assistant Examiner—William H. Thrower
Attorney, Agent, or Firm—Bell, Seltzer, Park & Gibson

[57] ABSTRACT

A method and apparatus for forming a longitudinal hem along one edge of a fabric using a hot melt adhesive for securement of the hem. The fabric is advanced along a predetermined path of travel while one longitudinal edge portion of the fabric is directed through an elongate heating chamber and heated to an elevated temperature. The heated edge portion of the fabric then passes through a folding station and the fabric is folded to form a hem. A stream of molten hot melt adhesive is deposited between the overlying fabric layers which define the longitudinal hem and pressure is applied to the hem to cause the molten adhesive to spread and penetrate into the fabric layers and to also prevent relative movement between the fabric layers until the adhesive is sufficiently cooled to secure the hem together.

8 Claims, 9 Drawing Figures

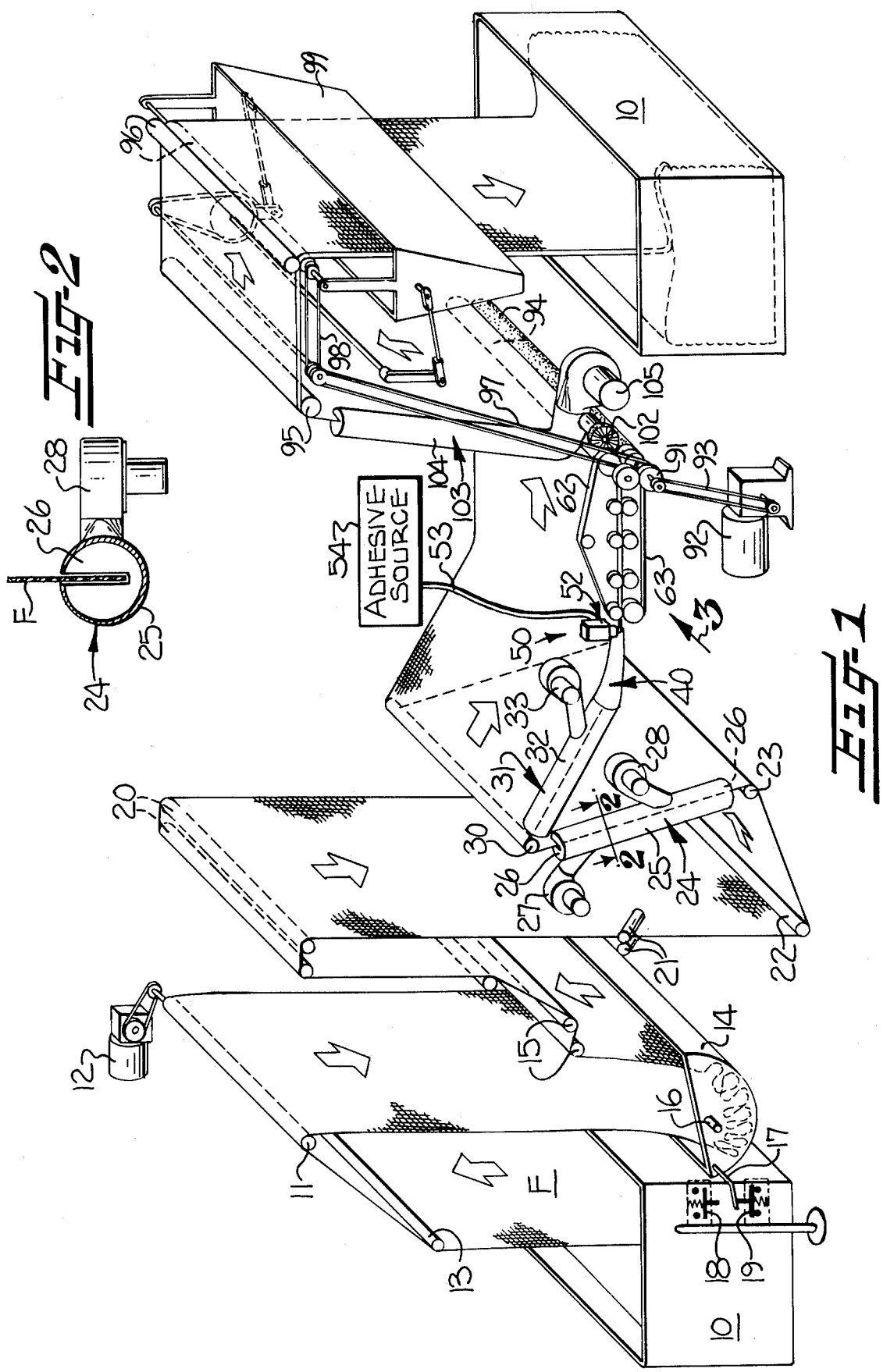

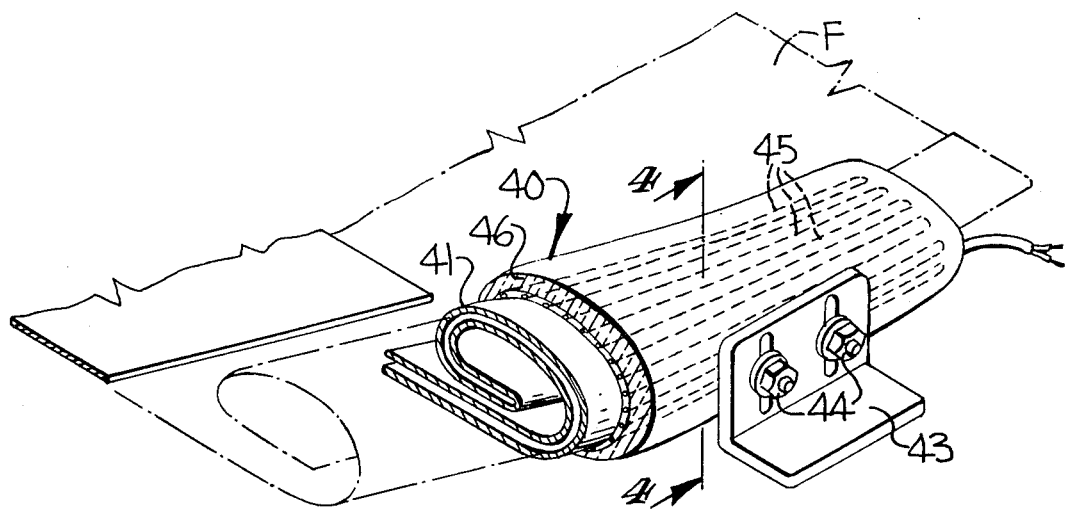
FIG-3
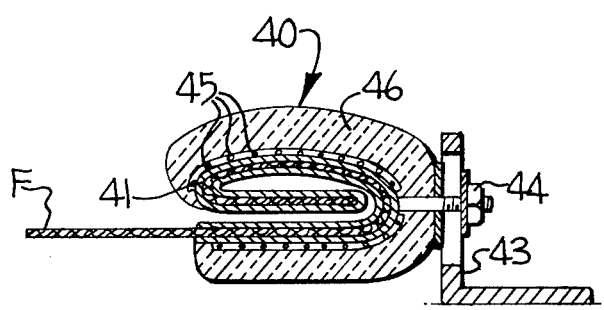
FIG-4
FIG-6
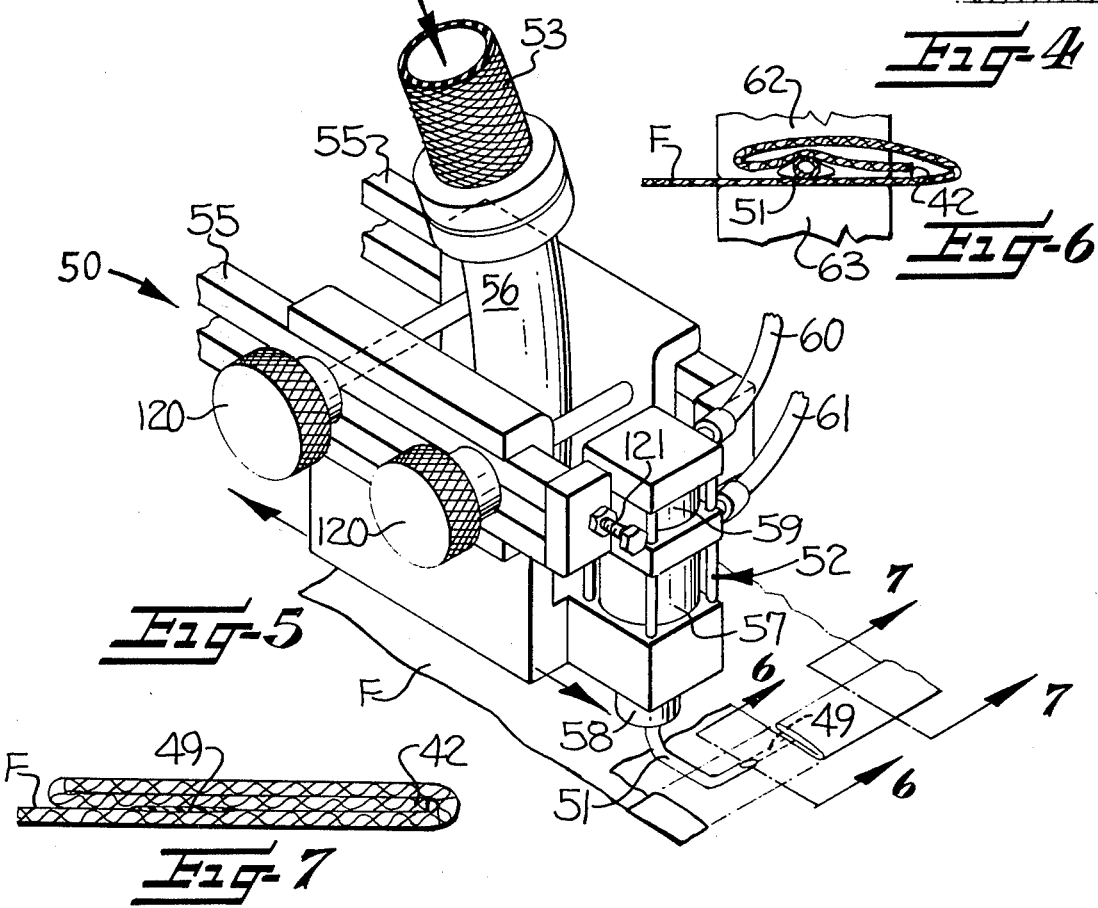
FIG-5
FIG-7

METHOD FOR HEMMING FABRIC USING A HOT MELT ADHESIVE

This invention relates to a method and apparatus for continuously forming a longitudinal hem in a fabric using a hot melt adhesive for securement of the hem.

BACKGROUND OF THE INVENTION

For some time it has been recognized that it would be desirable in many applications to eliminate the need for sewing in forming a fabric hem and to utilize an adhesive for securement of the hem. Various methods and devices have been proposed for this purpose, among which include the use of preformed beads or strips of adhesive which may be placed between the fabric layers and activated, as by heating, as well as the direct application of a molten hot melt adhesive to the fabric as disclosed in U.S. Patent Office Defensive Publication Numbers T926,006 and T926,010, published Sept. 3, 1974. However, the prior devices and methods for producing adhesively secured hems with which applicants are familar all have significant problems or deficiencies which make them totally impractical, or at best, of limited usefulness in commercial applications.

More particularly, the prior methods and devices with which applicants are familar have been unsuccessful in obtaining an adhesive bond of sufficient strength as to be commercially acceptable and capable of withstanding the handling and laundering encountered in normal use. Also, in the previously known devices and methods, significant production difficulties were presented in properly controlling the application of the adhesive to the fabric to avoid producing inferior or second quality products, as would result, for example from undesirable bleed-through of the adhesive to the visible surface of the fabric.

With the foregoing in mind, it is a primary object of the present invention to provide an effective and commercially practical method and apparatus for forming a hem in a fabric utilizing a hot melt adhesive for securement of the hem.

It is a further object of this invention to provide a method and apparatus of the type described which is capable of providing an adhesively secured hem having sufficient bond strength to withstand the handling and laundering encountered in normal use of the fabric.

It is a further object of this invention to provide a method and apparatus for forming an adhesively secured hem in a fabric capable of giving more effective and precise control over the penetration of the adhesive into the fabric in order to achieve enhanced and more uniform quality hems with a strong bond between the fabric layers and while avoiding undesirable bleed-through of the adhesive to the visible surface of the fabric.

It is still another object of this invention to provide a method and apparatus for forming an adhesively secured hem in a fabric and wherein the method and apparatus is especially suited for use in relatively heavy fabrics such as drapery fabrics and wherein the adhesively secured hem eliminates the puckers normally associated with a hem secured by sewing and thus produces a hem with greatly enhanced appearance over a conventionally sewn hem.

In the development work which led to the method and apparatus disclosed herein, it was learned that the poor bond strength observed when using a hot melt adhesive for securing fabric layers results not so much from the nature of the adhesive as from the manner of application of the adhesive. The hot melt adhesive used for securement of the fabric layers does not become significantly chemically bonded to the yarns or fibers, but rather the bonding results largely from a physical or mechanical attachment between the adhesive and the yarns or fibers. Where bond failure occurred, it was observed that the adhesive actually peeled away or separated from the fabric layer. In investigating this phenomenon further, it was determined that this failure was largely attributable to the adhesive becoming cooled and hardened or "crusted over" before it had an opportunity to penetrate into and between the yarns forming the fabric and to thereby become physically or mechanically secured to the fabric.

To overcome this problem the present invention provides for preheating the fabric to an elevated temperature prior to application of the molten adhesive thereto. This allows the hot melt adhesive to remain in a molten state for a longer period of time after application to the fabric so that the adhesive may penetrate into the fabric before hardening. The preheating of the fabric also provides an additional and effective control parameter which may be utilized alone, or in combination with other parameters such as application temperature of the adhesive, speed of advancement of the fabric, and amount of pressure applied, for precisely controlling the optimum penetration of the adhesive into the fabric.

In accordance with the present invention the fabric is continuously advanced along a predetermined path of travel while one longitudinal edge portion of the fabric is directed into and through a heating zone. The longitudinal edge portion of the fabric is heated to an elevated temperature and folded upon itself into overlying fabric layers to define a longitudinal hem along the edge of the fabric. A stream of hot melt adhesive is then applied between the overlying layers of the thus folded heated fabric, and immediately thereafter pressure is applied to the longitudinal hem to cause the adhesive to spread and penetrate into the fabric layers. During the application of pressure to the fabric, relative movement between the fabric layers is prevented until the adhesive sufficiently cools and hardens to secure the hem together.

The heating zone for heating the longitudinal edge portion of the fabric comprises an elongate heating chamber. The heating chamber preferably includes an elongate tubular member having a slit-like opening extending longitudinaly thereof for receiving the longitudinal edge portion of the fabric interiorly of the tubular member with the remaining portions of the fabric located outside the tubular member. A hot air blower cooperates with the elongate tubular member for directing a current of heated air into and along the interior of the tubular member and into contact with the longitudinal edge portion of the fabric being directed through the tubular member.

In order to apply pressure to the hem and prevent relative movement of the fabric layers after application of the molten adhesive to the fabric, the apparatus of the present invention provides a pair of endless belts, with means mounting the belts for movement along respective elongate paths in opposing contacting relation with one another to define an elongate compression zone therebetween for receiving and engaging the hem. More particularly, the means for mounting the pair of belts comprises respective sets of guide rolls for each belt and means for biasing the guide rolls of one set toward the corresponding guide rolls of the other set for applying pressure to the belts and to the hem positioned therebetween. The apparatus provides for adjusting the amount of pressure applied to the belts and to the hem positioned therebetween to thereby facilitate accurately controlling the amount of penetration of the molten adhesive into the fabric to prevent undesirable bleed-through of the adhesive to the visible surfaces of the fabric.

The apparatus and method of the invention also provide for receiving the advancing fabric upon the completion of the engagement and application of pressure to the adhesively secured hem and for directing the hem into and through an elongate cooling chamber while directing a current of air through the elongate cooling chamber and into contact with the hem for further cooling the adhesive to facilitate further handling of the fabric without disturbing the hem.

The method and apparatus of this invention are particularly well suited for continuously forming longitudinal hems in relatively heavy fabrics, such as drapery fabrics, such fabrics being generally formed from relatively coarse, soft twist yarns. However, the effective control over the adhesive application and penetration which can be achieved pursuant to this invention makes the method and apparatus of this invention useful with a broad range of fabrics of varying weight, construction, and texture.

BRIEF DESCRIPTION OF THE DRAWINGS

Some of the objects, features and advantages of the invention having been stated, others will become apparent as the description proceeds, when taken in connection with the accompanying drawings, in which—

FIG. 1 is a schematic perspective view showing an apparatus for continuously forming a longitudinal hem in a fabric in accordance with this invention;

FIG. 2 is a cross-sectional view of the heating chamber taken substantially along the line 2—2 of FIG. 1;

FIG. 3 is a fragmentary detailed perspective view showing the folding station;

FIG. 4 is a cross-sectional view of the folding station taken substantially along the line 4—4 of FIG. 3;

FIG. 5 is a fragmentary detailed perspective view showing the adhesive applying station;

FIG. 6 is a cross-sectional view of the adhesive applying station taken substantially along the line 6—6 of FIG. 5;

FIG. 7 is a cross-sectional view of the adhesively secured hem taken substantially along the line 7—7 of FIG. 5;

DETAILED DESCRIPTION OF PREFERRED EMBODIMENT

Figure 8:
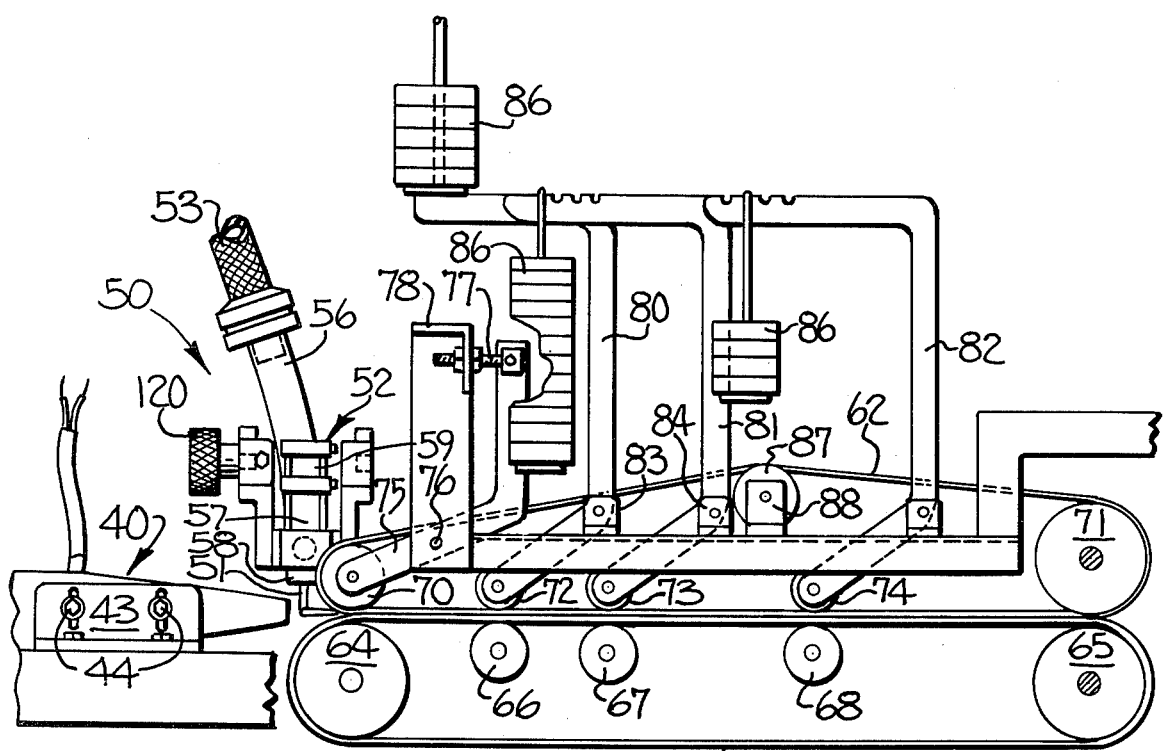
FIG. 8 is a detailed elevational view showing the adhesive applying station and the apparatus for applying pressure to the fabric following application of the hot melt adhesive.

Referring now more particularly to the drawings, and initially to FIG. 1 thereof, it will be seen that a supply of the fabric F which is to be hemmed in accordance with the method and apparatus of this invention is provided at one end of the apparatus in a suitable supply container such as a wheeled cart 10. The fabric F is withdrawn from the cart 10 by an elevated pull roll 11 which is driven in the manner to be described presently by a drive motor 12. An additional guide roll 13 assists in the removal of the fabric from the cart 10 and in directing the same to the pull roll 11. The fabric F is deposited from the pull roll 11 into a receiving trough 14 which is located adjacent the downstream side of the wheeled cart 10.

The receiving trough 14 serves as a transitory storage hopper or reservoir for the fabric F to assist in obtaining substantially continuous delivery of the fabric through the hem forming apparatus and obtaining substantially uniform tension in the fabric during processing. The receiving trough 14 has a smooth curved surface to permit the fabric F to freely move thereacross. As illustrated, the fabric is deposited into one side of the receiving trough 14 and falls into random loose folds in the trough. The fabric is removed from the opposite side of the trough and is directed upwardly by guide rolls 15.

To assist in the continuous delivery of fabric through the apparatus, the drive motor 12 is controlled to operate intermittently, and to periodically replenish the supply of fabric in the receiving trough 14 as the fabric is being continuously removed therefrom and processed through the hem forming machine. To this end, the receiving trough 14 is pivotally mounted from a mounting shaft 16 such that as fabric is delivered into the inlet side of the receiving trough from the pull roll 11, the weight of the fabric in the receiving trough 14 will cause the trough to tilt. As the trough tilts, an arm 17 extending therefrom will engage either one of two switches 18, 19 which are suitably mounted on a stationary support adjacent to the trough. The switches 18 and 19 are connected to the drive motor 12 by suitable electric wiring, not shown, to govern the starting and stopping of the motor 12. In this regard, it will be seen that the upper switch 18 serves to effect starting of the motor while the lower switch 19 causes the motor 12 to stop. When the supply of fabric in the trough 14 is nearly exhausted, the trough will tilt and cause the arm 17 to engage the upper switch 18, thereby causing the motor 12 to start. As fabric is deposited into the trough 14, the increasing weight of the fabric in the trough will cause the trough to tilt. When a sufficient supply of fabric has been deposited into the trough 14, the tilting of the trough will cause the arm 17 to engage the lower switch 19 and thereby stop the motor 12.

Upon being removed from the receiving trough 12, the fabric passes across the series of guide rolls 15 and over a pair of elevated guide rolls 20. The fabric is then advanced downwardly between a cooperating pair of edge straightening rolls 21, and then under additional guide rolls 22 and 23. The guide rolls 15, 20, 21, 22 and 23 collectively serve to straighten the fabric and remove any folds therefrom while also applying substantially uniform tension to the fabric. The edge straightening rolls 21 serve to insure that the longitudinal edge portion or selvage of the fabric is properly straightened and free from folds, while also serving to guide and position the longitudinal edge of the fabric at the proper location for subsequent processing.

As the fabric F leaves the roll 23 and begins its upward movement, one longitudinal edge portion thereof is directed into an elongate heating chamber, generally indicated by the reference character 24. The heating chamber 24 comprises an elongate tubular member 25 having a longitudinally extending slot-like opening therein for receiving the longitudinal edge portion of the fabric interiorly of the tubular member with the remaining portions of the fabric being located outside the tubular member. Opposite ends of the elongate tubular member are closed by end walls 26 which also have slot-like openings therein for passage of the fabric therethrough. A hot air blower 27 is mounted to the elongate tubular member 25 adjacent the downstream or outlet end thereof and is oriented to direct hot air into and through the interior of the tubular member 25 in a direction countercurrent to the direction of movement of the fabric therethrough. An additional hot air blower 28 is mounted on the opposite side of the tubular member 25 from the blower 27 and serves to direct additional heated air into and along the interior portion of the tubular member 25. It will thus be seen that as the longitudinal edge portion of the fabric F is advanced through the heating chamber 24, it is contacted by heated air from blowers 27 and 28 and is thereby heated to an elevated temperature.

Upon leaving the elongate heating chamber 24, the fabric F passes across an additional guide roll 30 which serves to change the direction of the advancing fabric F. The longitudinal edge portion of the fabric then enters a second elongate heating chamber, generally indicated by the reference character 31, which is of a construction similar to the heating chamber 24 and includes an elongate tubular member 32 having a longitudinal slot-like opening for receiving the edge portion of the fabric, and with a hot air blower 33 being mounted adjacent the downstream end of the tubular member 32 for directing a current of heated air into and along the interior portion of the tubular member 32 in a direction countercurrent to the advancing fabric.

While two separate heating chambers 24 and 31 have been utilized in the instant apparatus, it will be readily appreciated by those skilled in the art that the number of heating chambers utilized is not critical. The purpose of the heating chambers is to preheat the longitudinal edge portion of the fabric to an elevated temperature prior to application of the molten hot melt adhesive to facilitate penetration of the adhesive into the fabric for effective bonding. If the fabric is not sufficiently preheated, the adhesive may cool and harden on the surface of the fabric without becoming adequately attached or bonded thereto and may thus result in a weak or inferior bond between the fabric layers. However, excessive preheating of the fabric may cause the adhesive to remain molten too long resulting in undesirable bleed-through of the adhesive to the visable surfaces of the fabric, or the adhesive may be absorbed in the interior of the fabric to the extent that insufficient adhesive remains on the fabric surface for bonding. Preferably, the fabric is heated to a temperature of not less than 260° F. below the application temperature of the hot melt adhesive, with the precise temperature differential depending upon a number of factors including fabric construction, speed of application, pressure applied to the hem, etc. While two separate heating chambers have been utilized in the illustrated apparatus for the purpose of preheating the fabric, it is contemplated that a single heating chamber could be suitably used in some applications or that more than two heating chambers may be necessary depending upon the temperature desired for the fabric and the particular configuration of the apparatus and path of travel of the fabric therethrough.

Upon leaving the heating chamber 31, the longitudinal edge portion of the fabric is directed through a folding station, generally indicated by the reference character 40, where the fabric is folded upon itself into overlying fabric layers to define a longitudinal hem along the edge of the fabric. The folding station 40, as shown in more detail in FIG. 3, includes an elongate folding guide 41 or "trumpet" of known construction, and which is preferably made of a metallic sheet material and formed into a convoluted configuration to define an elongate guiding passageway for the advancing fabric. As the fabric passes through the folding guide 41 the fabric is guided into the desired folded configuration for the hem. As shown in FIG. 7, a folded hem formed of three fabric layers is produced by the folding guide 41, with the terminal edge portion or selvage 42 of the fabric being located interiorly of the three fabric layers to hide the raw edge or selvage and present a finished appearance to the hem. However, it will be appreciated that the present invention is also applicable for adhesively securing hems of other folded configurations.

Referring further to the folding station, as best illustrated in FIGS. 3 and 4, it will be noted that the folding guide 41 is secured in place by a mounting bracket 43 and is suited for being adjustably positioned by adjustment of the mounting bolts 44 in the slot-like openings provided in the mounting bracket 43. Preferably, electrical resistance heating elements 45 are secured by adhesive or other suitable means to the exterior surface of the folding guide 41 and the exterior surface portions of the folding guide 41 are wrapped in insulation 46. The provision of resistance heating elements 45 and the insulation 46 serves to prevent or reduce heat loss from the heated longitudinal edge portion of the fabric as it is advanced through the folding guide 41 so that the fabric is maintained in a heated condition at the desired temperature as it reaches the adhesive applying station 50 located immediately on the outlet end of the folding station 40.

The adhesive applying station 50 directs a continuous relatively small bead of molten hot melt adhesive 49 (FIG. 7) between the front and middle fabric layers forming the longitudinal hem for thereby adhesively securing the fabric layers together. More particularly, as best illustrated in FIG. 5, the adhesive applying station 50 includes an elongate tubular extrusion nozzle 51 which extends from the hot melt applicator assembly, generally indicated by the reference character 52, and has its free end portion extending between the front and middle fabric layers for depositing the bead of molten adhesive 49 therebetween. The extrusion nozzle 51 has a right angle bend adjacent the free end thereof so that the free end or tip of the extrusion nozzle 51 is oriented in the downstream direction. Molten hot melt adhesive from a suitable commercially available hot melt adhesive melting apparatus, indicated diagrammatically in FIG. 1 by the reference character 54, is directed under pressure to the hot melt applicator assembly 52 via a flexible conduit 53. As illustrated in FIG. 5, the hot melt applicator assembly 52 is mounted on horizontally extending support arms 55 and is adapted for being adjustably positioned on the support arms 55 to permit precisely positioning the tip of the extrusion nozzle 51 at the desired location within the hem. Thumbscrews 120 are provided at the side of one of the support arms 55 to facilitate adjusting the position of the applicator assembly 52 along the support arms, while a bolt 121 is provided at the end of one of the support arms 55 to serve as an adjustable stop member to facilitate repositioning the nozzle 51 to the same place after the assembly 52 has been moved for servicing.

Molten adhesive from the flexible conduit 53 is directed along a conduit 56 through a valve assembly 57 and to a supporting mount 58 for the nozzle 51. A pneumatic cylinder 59 cooperates with the valve assembly 57 to permit stopping the flow of adhesive from the nozzle when necessary, as for example for servicing and the like. Control lines 60 associated with the pneumatic cylinder 59 supply pressurized fluid to the pneumatic cylinder for actuating the valve assembly 57 to start or stop the flow of adhesive from the nozzle 51.

Immediately following the application of the molten adhesive between the overlying fabric layers of the hem, the fabric layers are directed into an elongate compression zone defined between a pair of opposing endless belts 62, 63. In the compression zone, pressure is applied to the hem to cause the bead of molten adhesive 49 to penetrate into the fabric layers. The compression zone defined between the belts 62, 63 also serves to prevent relative movement between the fabric layers until the molten adhesive has cooled and hardened sufficiently to secure the fabric layers together.

Figure 9:
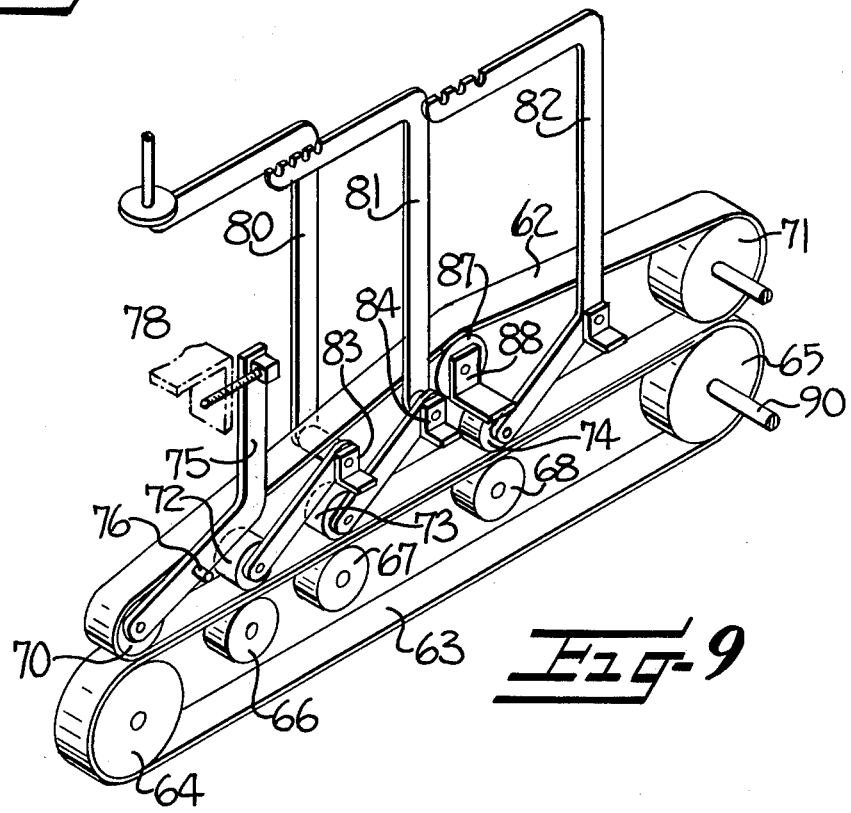
FIG. 9 is a perspective view of the pressure applying apparatus of FIG. 8.

Referring more particularly to FIGS. 8 and 9, the belts 62, 63 are mounted for movement in their respective elongate paths of travel by respective sets of guide rolls. More particularly, the lower belt 63 is mounted for movement in an elongate run extending between an upstream guide roll 64 and a downstream guide roll 65. As illustrated, three intermediate guide rolls 66, 67, 68 of a smaller diameter are located between the endmost guide rolls 64 and 65 and serve to support the upper portion of the lower belt 63 in its elongate run from upstream guide roll 64 to the downstream guide roll 65. The upper belt 62 is mounted for movement between an upstream guide roll 70 and a downstream guide roll 71, with the rolls 70 and 71 being located directly above the corresponding roll 64 and 65 for the lower belt so that the lower elongate run of the upper belt 62 is in opposing contacting relation with the upper elongate run of the lower belt 63. Intermediate guide rolls 72, 73 and 74 are located directly above the corresponding intermediate guide rolls 66, 67 and 68 for the lower belt 63 and serve to assist in guiding the lower portion of the upper belt 62 in its elongate run between rolls 70 and 71. An upper guide roll 87, mounted to stationary support 88, guides the upper portion of belt 62 in its return upstream from roll 71 to roll 70.

In order to permit adjusting the amount of pressure exerted on the fabric in the nip defined between the belts 62, 63, means is provided to permit adjusting the spacing between the upper and lower belts 62, 63. More particularly, the upstream guide roll 70 for the upper belt 62 is mounted to one end of a generally L-shaped support arm 75. The L-shaped support arm 75 is pivotally mounted to a support 76 adjacent the bend in the L-shaped arm, and with the opposite end portion of the support arm 75 being provided with an adjustment screw 77 which extends from the support arm 75 to a stationary support 78. By suitable adjustment of the adjustment screw 77, the distance between the axes of rolls 64 and 70 may be adjusted as desired, and in so doing, the amount of pressure exerted on the fabric as it enters the nip defined between the belts 62, 63 may be adjusted.

Intermediate guide rolls 72, 73 and 74 are carried by respective mounting arms 80, 81 and 82 which are pivotally mounted to respective supports 83, 84 and 85 so as to permit adjustment of the distance between the axes of the upper rolls 72, 73, 74 and the corresponding rolls 66, 67 and 68 of the lower set of rolls. The upper ends of the mounting arms 80, 81 and 82 are adapted to receive weights 86 which serve to bias the guide rolls 72, 73, 74 downwardly toward the corresponding lower guide rolls 66, 67, 68 for the lower belt and thereby force the belts toward one another to apply pressure to the hem portion of the fabric positioned between the belts. The weight carried by the respective mounting arms 80, 81 and 82 may be varied as desired in order to adjust the amount of pressure exerted on the hem as it progresses along the elongate nip defined between the belts 62, 63.

It will be appreciated that the spacing between the upstream guide rolls 64, 70 and the pressure exerted between the intermediate guide roll pairs 66, 72; 67, 73; and 68, 74 may be adjusted as desired depending upon a number of factors including the weight, thickness and porosity of the fabric, type of adhesive, rate of advancement of the fabric through the nip, etc. In adjusting the rolls it is important to exert sufficient pressure to force the molten adhesive into the fabric in order to obtain a strong mechanical bond between the adhesive and the fabric for effectively securing the hem together. However, it is important that the pressure applied not be so great as to force the adhesive completely through the fabric so that the adhesive is visible on the exterior surface of the hemmed fabric. Generally, the upstream fixedly mounted rolls 64, 70 will be adjusted to exert the greatest compression on the fabric hem, and the intermediate rolls 66, 72; 67, 73; and 68, 74 will exert somewhat less compressive force and serve primarily to hold the fabric in place as it advances through the compression zone.

As best seen in FIG. 9, the belts are driven in simultaneous movement by drive shafts 90 connected to the downstream guide rolls 65, 71. The drive shafts 90 are interconnected for rotational movement by cooperating gears 91 (FIG. 1) to turn at the same rate of speed but in opposite directions. A motor 92 is connected to the lower drive shafts 90 by a drive belt 93 or other suitable means. From FIG. 1 it will also be noted that the drive shafts 90 are also connected to a cooperating pair of fabric pulling rolls 94 which extend across the width of the fabric and serve to continously pull the fabric from the receiving trough 14 and through the various successive work stations of the apparatus.

Upon leaving the fabric pulling rolls 94 the fabric is directed upwardly to an upper guide roll 95 and then horizontally to a second cooperating pair of fabric pulling rolls 96. The fabric pulling rolls 96 are driven at the same rate of speed as the rolls 94 through a series of drive belts 97, 98 and associated pulleys. Upon leaving the fabric pulling rolls 96, the fabric F passes downwardly through a fabric guide 99 and is deposited into a suitable receptacle such as a wheeled cart 10. As the fabric is deposited into the wheeled cart, the fabric guide 99 is reciprocated back and forth by means of a suitable drive arrangement 101, also driven by motor 92, to thereby deposit the fabric in folds in the wheeled cart 10.

Referring still to FIG. 1, it will be noted that as the fabric leaves the nip defined between belts 62, 63 and begins its upward movement, a rotating brush 102 engages the face of the fabric opposite the hem. Brush 102 is provided as a precautionary measure to brush away any molten adhesive which might have penetrated through to the front face of the fabric, as in the event of improper adjustment of belt pressure or preheating temperature. As the fabric continues its upward movement it enters an elongate cooling chamber 103. The cooling chamber comprises an elongate tubular member 104 having a longitudinal slot therein for receiving the hemmed edge portion of the fabric interiorly of the tubular member 104 with the remaining portions of the fabric being located outside the tubular member. A blower 105 is provided at one end of the tubular member for directing a flow of cooling air, which may be ambient air, into and along the interior of the tubular member and into contact with the adhesively secured hem located therein. The cooling chamber 103 serves to assist in cooling the adhesive from its molten state to form a firm secure bond between the fabric layers to thereby prevent disturbing the hem during the subsequent folding and handling of the fabric.

The method and apparatus of this invention has been illustrated herein as utilized for forming a single longitudinal hem in a fabric. When a longitudinal hem is desired along the remaining longitudinal edge of the fabric, the fabric may be directed through the apparatus a second time, with the trailing end of the fabric from the first pass through the apparatus serving as the leading end for the second pass.

The method and apparatus of this invention may utilize various types of hot melt adhesives. Particularly suitable for use in bonding the hems on relatively heavy weight fabrics such as drapery fabrics are hot melt copolyester adhesive compositions with a viscosity range of 96,250 cps to 41,000 cps at an application temperature of 400° to 425° F.

In the drawings and specification, there has been set forth a preferred embodiment of the invention, and although specific terms are employed, they are used in a generic and descriptive sense only and not for purposes of limitation.

That which is claimed is:

1. A method for continuously forming a longitudinal hem along one edge of a fabric using a hot melt adhesive for securement of the hem, said method comprising continuously advancing the fabric along a predetermined path of travel while directing one longitudinal edge portion of the fabric into and through a heating zone to preheat the longitudinal edge portion of the fabric and while directing the preheated longitudinal edge portion of the advancing fabric into and through a folding guide and folding the edge portion upon itself into overlying fabric layers to define a longitudinal hem along the edge of the fabric and while also applying heat to the folding guide to assist in maintaining the longitudinal edge portion of the fabric in a preheated condition as the fabric is advanced through and folded by the folding guide, applying a stream of molten hot melt adhesive between the overlying fabric layers of the thus folded preheated fabric, and immediately following the application of adhesive directing the hem into an elongate compression zone and applying pressure to the longitudinal hem to cause the molten adhesive to spread and penetrate into the fabric layers and while also preventing relative movement between the fabric layers until the adhesive has sufficiently cooled to secure the hem together.

2. A method according to claim 1 wherein the directing of the fabric through a heating zone comprises advancing the longitudinal edge portion of the fabric into and through an elongate heating chamber while directing heated air through the chamber and into contact with the edge portion of the fabric passing therethrough.

3. A method according to claim 2 wherein the directing of heated air through the chamber comprises directing heated air into and along the interior of the chamber in a direction countercurrent to the direction of advancement of the fabric therethrough.

4. A method according to claim 1 wherein the directing of the fabric through a heating zone comprises enclosing the longitudinal edge portion of the advancing fabric in an elongate tubular heating chamber with the remaining portions of the fabric being located outside the heating chamber, and directing a current of heated air into and along the interior of the heating chamber and into contact with the longitudinal edge portion of the fabric advancing therethrough.

5. A method according to claim 1 wherein the step of directing the hem into an elongate compression zone and applying pressure to the longitudinal hem comprises directing the hem between a pair of endless belts mounted for movement in opposing relation with one another and advancing the opposing belts with the hem located therebetween while biasing the belts toward one another to apply pressure to the hem.

6. A method according to claim 1 including the further step of receiving the advancing fabric upon completion of the engagement and application of pressure to the adhesively secured hem and directing the hem into and through an elongate cooling chamber while directing a current of air through the elongate chamber and into contact with the hem for further cooling the adhesive to facilitate further handling of the fabric without disturbing the hem.

7. A method according to claim 1 wherein said steps of continuously advancing fabric along a predetermined path of travel comprises periodically withdrawing the fabric from the supply source and depositing the fabric in a transitory storage hopper to provide a predetermined reservoir of fabric in the storage hopper while continuously withdrawing the fabric from the storage hopper and directing the fabric therefrom for continuous formation of the longitudinal hem therein.

8. A method for continuously forming a longitudinal hem along one edge of a fabric using a hot melt adhesive for securement of the hem, said method comprising continuously advancing the fabric along a predetermined path of travel while directing one longitudinal edge portion thereof into and through an elongate heating chamber and heating the longitudinal edge portion of the fabric, directing the advancing fabric from the heating chamber to a folding station and folding the heated longitudinal edge portion of the fabric upon itself into overlying fabric layers to define a longitudinal hem along the edge of the fabric, directing the thus folded longitudinal hem to an adhesive applying station and applying a stream of molten hot melt adhesive between the overlying fabric layers, immediately following the application of adhesive between the fabric layers, applying pressure to the longitudinal hem to cause the adhesive to spread and penetrate into the fabric layers and while preventing relative movement between the fabric layers until the adhesive has cooled sufficiently to adhesively secure the hem together, and upon completion of the engagement and application of pressure to the longitudinal hem, directing the hem into and through an elongate cooling chamber while directing a current of air through the elongate chamber and into contact with the adhesively secured longitudinal hem for further cooling the adhesive to facilitate further handling of the fabric without disturbing the hem.

* * * * *